US008431081B2

(12) United States Patent
Demirel et al.

(10) Patent No.: US 8,431,081 B2
(45) Date of Patent: *Apr. 30, 2013

(54) METHOD AND APPARATUS FOR REGENERATING AN IRON-BASED FISCHER-TROPSCH CATALYST

(75) Inventors: Belma Demirel, Longmont, CO (US); Mark S. Bohn, Golden, CO (US); Charles B. Benham, Arvada, CO (US); James E. Siebarth, Lakewood, CO (US); Mark D. Ibsen, Highlands Ranch, CO (US)

(73) Assignee: Rentech, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,961

(22) Filed: May 10, 2011

(65) Prior Publication Data
US 2011/0211996 A1 Sep. 1, 2011

Related U.S. Application Data

(62) Division of application No. 11/874,661, filed on Oct. 18, 2007, now Pat. No. 7,964,156, which is a division of application No. 11/005,873, filed on Dec. 7, 2004, now Pat. No. 7,303,731, which is a division of application No. 10/728,109, filed on Dec. 4, 2003, now Pat. No. 6,838,487.

(51) Int. Cl.
*B01J 8/20* (2006.01)
*B01J 8/22* (2006.01)
*B01J 38/48* (2006.01)

(52) U.S. Cl.
USPC ........... 422/140; 422/144; 422/145; 422/147; 422/223; 422/234; 518/709; 518/710; 502/22

(58) Field of Classification Search .................. 422/140, 422/144, 145, 147, 223, 234; 518/709, 710; 502/22
See application file for complete search history.

(56) References Cited

U.S. PATENT DOCUMENTS

| | | | |
|---|---|---|---|
| 2,487,867 A | 11/1949 | Griffin, Jr. | |
| 2,533,072 A | 12/1950 | Voorhies, Jr. | |
| 2,620,347 A | 12/1952 | Rottig | |
| 2,632,015 A | 3/1953 | Kratzer | |
| 2,661,338 A | 12/1953 | Lanning | |
| 2,670,364 A | 2/1954 | Hemminger | |
| 3,452,517 A * | 7/1969 | Buckland | 96/144 |
| 5,260,239 A | 11/1993 | Hsia | |
| 5,268,344 A | 12/1993 | Pedrick et al. | |
| 5,288,673 A | 2/1994 | Behrmann et al. | |
| 5,397,806 A | 3/1995 | Soled et al. | |
| 5,620,670 A | 4/1997 | Benham et al. | |
| 5,811,363 A | 9/1998 | Leviness et al. | |
| 5,811,468 A | 9/1998 | Chang et al. | |
| 5,811,469 A * | 9/1998 | Leviness et al. | 518/700 |
| 5,817,701 A | 10/1998 | Leviness et al. | |
| 5,821,270 A | 10/1998 | Chang et al. | |
| 5,827,903 A * | 10/1998 | White et al. | 518/710 |

(Continued)

*Primary Examiner* — Jennifer A Leung
(74) *Attorney, Agent, or Firm* — Timothy S. Westby; Porter Hedges LLP

(57) ABSTRACT

Solvent extraction is used to remove wax and contaminants from an iron-based Fischer-Tropsch catalyst in a natural circulation continuous-flow system. The wax-free catalyst is then subjected to controlled oxidation to convert the iron to its initial oxidized state, $Fe_2O_3$. Reactivation of the oxide catalyst precursor is carried out by addition of synthesis gas.

17 Claims, 3 Drawing Sheets

U.S. PATENT DOCUMENTS

| | | |
|---|---|---|
| 5,977,192 A * | 11/1999 | Howsmon et al. ............ 518/700 |
| 6,022,755 A | 2/2000 | Kinnari et al. |
| 6,068,760 A | 5/2000 | Benham et al. |
| 6,114,399 A | 9/2000 | Roberts et al. |
| 6,121,179 A | 9/2000 | McBrayer, Jr. et al. |
| 6,160,026 A | 12/2000 | Dai et al. |
| 6,162,754 A | 12/2000 | Maretto et al. |
| 6,201,030 B1 | 3/2001 | Beer |
| 6,217,830 B1 | 4/2001 | Roberts et al. |
| 6,838,487 B1 | 1/2005 | Demirel et al. |
| 7,303,731 B2 * | 12/2007 | Demirel et al. ................ 422/223 |
| 7,964,156 B2 * | 6/2011 | Demirel et al. ................ 422/223 |
| 2002/0183403 A1 | 12/2002 | Huang et al. |

* cited by examiner

METHOD AND APPARATUS FOR REGENERATING AN IRON-BASED FISCHER-TROPSCH CATALYST

CROSS-REFERENCE TO RELATED APPLICATIONS

This application is a divisional application which claims the benefit under 35 U.S.C. §121 of U.S. patent application Ser. No. 11/874,661, which is a divisional of U.S. patent application Ser. No. 11/005,873, which claims priority to U.S. Pat. No. 6,838,487, the disclosures of each of which are hereby incorporated herein by reference.

STATEMENT REGARDING FEDERALLY SPONSORED RESEARCH OR DEVELOPMENT

Not Applicable.

FIELD OF INVENTION

The present invention relates to the production of liquids and waxes from synthesis gas using the Fischer-Tropsch (FT) process, and more particularly to regenerating an iron-based FT catalyst that has become deactivated due to buildup of contaminants on the surface of the catalyst.

BACKGROUND OF THE INVENTION

The low costs associated with iron-based FT catalysts have heretofore been a major factor in the lack of development of methods for regenerating these catalysts. However, increasing concerns over disposal of industrial wastes in landfills from both economic and environmental standpoints have created a need for improved methods for recycling spent catalysts—even for the low-cost catalysts. When a catalyst is employed in a slurry reactor, disposal of spent catalyst can be challenging. Some methods have been proposed which rejuvenate iron-based catalysts for a short period of time, but an economical method is needed for returning the catalyst back to its initial oxide state without causing attrition or sintering of the catalyst.

Moreover, to regenerate such iron-based catalysts, several areas of concern must be addressed. The oxidation step must be controlled to prevent overheating and sintering of the catalyst. Usually, the temperature during oxidation is controlled by limiting the percentage of oxygen present in the gases used for oxidation. However, when limited oxygen is available during oxidation, the presence of wax with the catalyst can cause carbon formation. Therefore, efficient and complete wax removal is a key to successful catalyst regeneration.

Further, de-waxing must be carried out in a continuous flow system without subjecting the catalyst to mechanical stresses, which can cause the catalyst particles to break apart.

The present invention provides an economical method of returning an iron-based FT catalyst back to its initial oxide state without causing catalyst attrition or sintering, thereby allowing the regeneration of a catalyst that has become deactivated due to buildup of contaminants on its surface.

DESCRIPTION OF THE PRIOR ART

There are several potential mechanisms of deterioration of iron-based FT catalysts. The primary mechanisms suspected of causing deterioration include composition change of the catalyst, crystallite growth due to sintering, and contamination of active sites by a carbon layer. In addition, iron-based catalysts undergo a shift in selectivity toward the production of lighter products with time on stream as well as a reduction in activity.

Thus, it is well-known that build up or growth on the surface of the catalyst tends to inhibit the activity of the catalyst. U.S. Pat. No. 5,397,806 issued to Soled et al. states, "In virtually any catalytic process, catalyst activity decreases as run length increases due to a variety of factors: deposition of coke or carbon on the catalyst as a result of cracking, hydrogenolysis, or polymerization, buildup of poisons in the feed such as sulfur or nitrogen compounds, etc. In hydrocarbon synthesis reactions, carbon tends to build up or grow (by complex polymerization mechanisms) on the surface of the catalyst, thereby shielding the catalytic metals from the reactants. Activity decreases and at some pre-set level of activity (as defined by conversion or selectivity or both), the process becomes sufficiently uneconomical to continue and the catalyst is either replaced or regenerated. In either case, downtime results and in the former, significantly increased catalyst costs are incurred."

U.S. Pat. No. 2,620,347 to Rottig describes an iron-based catalyst, an operating regime, and a solvent extraction procedure to produce a catalyst which converts about 70% of the water gas ($H_2$:CO=1) to substantial amounts of hydrocarbon products boiling above 300° C. One of the catalysts described therein was prepared by soda precipitation of iron and copper nitrates, washed, impregnated with potassium phosphate and dried. The catalyst precursor was then reduced in hydrogen at 230° C. The reduced catalyst was treated with water gas at a temperature of 150° C. at atmospheric pressure. Over a period of 48 hours, the temperature was increased to 190° C. at which point the carbon monoxide plus hydrogen conversion reached 85%. During the next 48 hours, the hydrogen conversion dropped to 27% by reason of adsorption of paraffin material onto the catalyst. The exhausted catalyst was then thoroughly extracted at a temperature between 170° C. and 195° C. with five times its volume of hydrogenated diesel oil fraction having a boiling point between 220-260° C. This regenerated catalyst was again subjected to water gas at 150° C., as before. Here, the carbon monoxide plus hydrogen conversion was about 45%. After 72 hours, the conversion dropped to 40% by reason of adsorption of paraffin material onto the catalyst. The synthesis and regeneration cycles were repeated several times until the carbon monoxide plus hydrogen conversion stabilized at about 70%. Rottig's catalyst had a useful life of several thousand hours with an average conversion rate of about 70%. During this period, regenerative extractions were carried out every 5-6 days initially and every 10-14 days subsequently.

U.S. Pat. No. 2,632,015 to Kratzer describes a novel regeneration process using ethanol. The procedure is directed toward removing carbon from an iron catalyst which has operated at high temperatures in a fluidized bed Fischer-Tropsch reactor. The carbon on the catalyst, or perhaps the carbon in iron carbide, reacts with ethanol in a fluid bed reactor at a pressure between 150 psi and 600 psi and a temperature between 660° F. and 680° F. to produce acetone. The ethanol is separated from the acetone and recycled to the regenerator. Additional treatment of the catalyst is described whereby hydrogen, or a mixture of hydrogen and steam, is introduced into the fluidized bed at a temperature between 700° F. and 900° F. for a period of time between eight and fifteen hours.

U.S. Pat. No. 6,121,179, McBrayer, Jr. et al. describes a process for removing organic contaminants from adsorbent materials using supercritical water. The organic contaminants are destroyed in a second stage by oxidation.

U.S. Pat. Nos. 6,114,399 and 6,217,830, both to Roberts and Kilpatrick, disclose methods and apparatus, respectively, for using supercritical organic solvents to effect wax/catalyst separation for a FT slurry reactor. In these patents, the solvent and wax/catalyst slurry are mixed to dissolve wax in the solvent, and the wax-laden solvent is separated from the catalyst, which is returned to the FT reactor. The solvent and wax are separated via one or more stages of flash separation. The recovered solvent is recycled to the mixer and the wax is collected as product. The procedures described in these patents, however, do not provide a wax- and contaminant-free catalyst.

U.S. Pat. No. 2,487,867 to Griffin, Jr. describes a process for purifying catalyst particles used in a fluidized bed FT reactor. A slipstream of catalyst and hydrogen is fed to a hydrogenation reactor wherein waxy and oily deposits are destructively hydrogenated to form volatile products, and to lower the molecular weight and viscosity of the oily material remaining on the catalyst. The catalyst is then fed to a second vessel for washing with a solvent. After drying, the catalyst is returned to the fluidized bed FT reactor. For an iron-based catalyst, Griffin, Jr. recommends that the hydrogenator be operated at a temperature of 450° F. to 750° F., and at a pressure of 25-350 psig. The solvent can be naphtha, gasoline, or liquefied petroleum gases.

U.S. Pat. No. 2,533,072 to Voorhies, Jr. discloses a hydrogen treatment method of decarbonizing a FT catalyst used in a fluidized bed reactor. Since the decarbonizer must operate at a higher temperature (1000-1200° F.) than the FT reactor (600-750° F.), sufficient CO is supplied along with the hydrogen, which is fed to the decarbonizer to provide an exothermic reaction to heat the decarbonizer to the requisite temperature. Sufficient carbon is removed from the catalyst to maintain a carbon content of the catalyst in the FT reactor of below 20 percent by weight.

U.S. Pat. No. 5,817,701, Leviness and Mitchell, describes a process for rejuvenating a partially deactivated catalyst used in a three-phase FT bubble column reactor (BCR). Synthesis gas flow into the FT reactor is interrupted and replaced with a hydrogen rich rejuvenating gas. This rejuvenating gas is recycled back to the reactor after water scrubbing removes deactivating species. The rejuvenating gas was specified to contain at most 5-10% CO and to have a $H_2$:CO ratio of at least 3-5. In one embodiment of the invention, $CO_2$ was present in the rejuvenating gas in sufficient amounts to suppress the water gas shift reaction.

In U.S. Pat. No. 6,162,754, Maretto et al. describe the use of a draft tube situated inside a FT slurry BCR for regenerating catalyst. Catalyst flows from the top of the draft tube downward between the draft tube and reactor wall. A regenerating gas, preferably hydrogen, is introduced into this annular region for contact with the catalyst. After a period of time, the hydrogen flow is stopped and circulation of slurry from the draft tube into the annular region resumes, thereby displacing the regenerated catalyst into the draft tube where the FT reaction takes place. This sequence is repeated without having to interrupt the FT reaction.

In U.S. Pat. No. 6,022,755, Kinnari and Schanke describe a novel method of regenerating a catalyst used in a slurry BCR. In order to provide a hydrogen-rich gas for regeneration, the space velocity is lowered to a level wherein the outlet gas composition is low in carbon monoxide and high in hydrogen. During this mode of operation, the CO conversion is high, the $H_2$:CO ratio is high, the $CO_2$ selectivity is high, and the C5+ selectivity is low. The resulting effect of the new reaction mode is a regenerative gas mixture. Therefore, it is not necessary to change the synthesis gas composition for regeneration.

When an iron-based catalyst has deactivated irreversibly, however, oxidation may be the only way to remove the deactivating species and allow salvaging of the catalyst. Under these circumstances, re-activating the resulting iron oxide (hematite) is necessary. The difficulty in oxidizing the precipitated iron catalyst is, however, preventing overheating and sintering of the catalyst.

U.S. Pat. No. 2,661,338 to Lanning teaches a procedure for regenerating an iron-based FT catalyst used in a fluidized bed reactor. In Lanning, carbonaceous deposits are oxidized in a combustion reactor and iron oxide is melted as it falls through a combustion zone. Solid iron oxide particles are formed as the droplets move down through a cooling zone of the reactor. Agglomerated particles are broken up by grinding. The fused iron particles are reduced in hydrogen and returned to the FT reactor. This method, however, is not applicable to a precipitated iron catalyst.

Kalbel and Ralek [Catal. Rev.-Sci. Eng., 21(2), 246-247 (1980)] refer to the successful regeneration of a precipitated iron catalyst used in a slurry BCR by controlled oxidation. However, no details were revealed.

Publication No. US 200210183403 A1 to Huang et al., which published Dec. 5, 2002, discloses a process for regenerating a slurry FT catalyst, which involves de-waxing and drying the catalyst sufficiently to produce a free-flowing catalyst powder that is fluidizable; fluidizing the catalyst powder; treating the catalyst powder with an oxygen treatment; reducing the catalyst powder with a reducing gas to form a reduced catalyst powder; and mixing the reduced catalyst powder with hydrocarbons to form a regenerated, slurry catalyst. Although the process is similar to that of the present invention, Huang et al. does not teach catalyst regeneration involving the apparatus of the present invention.

Apparatus

Several patents describe various means for integrating catalyst rejuvenation or regeneration steps with a FT slurry bubble column reactor.

Illustrative of such prior art are the following patents: U.S. Pat. No. 5,260,239 issued to Stephen J. Hsia, titled "External Catalyst Rejuvenation System for the Hydrocarbon Synthesis Process"; U.S. Pat. No. 5,268,344 issued to Pedrick et al., titled "Draft Tube for Catalyst Rejuvenation and Distribution"; U.S. Pat. No. 5,288,673 issued to Behrmann et al., titled "Temperature Control in Draft Tubes for Catalyst Rejuvenation"; U.S. Pat. No. 5,811,363 issued to Leviness et al., titled "Catalyst Rejuvenation in Hydrocarbon Synthesis Slurry with Reduced Slurry Recontamination"; U.S. Pat. No. 5,811,468 issued to Chang et al., titled "Combination Gas Disengaging Downcomer-Rejuvenation Tube for In-situ Slurry Catalyst Rejuvenation (LAW541)"; U.S. Pat. No. 5,821,270 issued to Chang et al., titled "Slurry Hydrocarbon Synthesis Process with Multistage Catalyst Rejuvenation"; and U.S. Pat. No. 6,201,030 issued to Gary L. Beer, titled "Process and Apparatus for Regenerating a Particulate Catalyst."

SUMMARY OF THE INVENTION

In accordance with the present invention, catalyst in a slurry is removed from a FT reactor, de-waxed and subjected to controlled oxidation to restore the catalyst to its original oxidized and unactivated state. The following steps are carried out: 1) a slurry comprising wax and catalyst removed from a Fischer-Tropsch reactor is placed into a vessel and heated to about 120° C. (the melting point of wax) or higher;

2) a gas is introduced into the bottom of the vessel thereby producing a three-phase bubble column; 3) degassed slurry from the vessel is allowed to flow under natural circulation through a catalyst settling vessel back to the bubble column vessel, thereby returning slurry containing deactivated catalyst to the bubble column vessel; 4) extraction solvent is added to the bubble column vessel to maintain slurry level as catalyst-free wax and solvent are removed from the catalyst settling vessel; 5) catalyst-free wax and solvent which are removed from the catalyst settling vessel are fed to a flash vessel for separation of wax and solvent; 6) separated wax is sent to a wax recovery, or wax hydrocracking, system; 7) recovered solvent from the flash vessel is returned to the bubble column vessel along with solvent which is recovered from separation of bubble column overhead gas; 8) the dewaxed catalyst in the bubble column vessel is separated from the solvent and subjected to controlled oxidation; 9) after purging the bubble column vessel with inert gas, the oxidized catalyst precursor in the bubble column vessel is mixed with wax, diesel or other suitable slurry medium to form a three-phase slurry comprised of catalyst precursor, slurry medium, and inert gas; 10) the three-phase slurry is treated with synthesis gas in a slurry mode to produce an active catalyst containing iron carbides; and 11) the slurry containing the activated catalyst is removed from the bubble column vessel.

One aspect of the present invention is that wax removal and recovery from a deactivated catalyst is nearly 100%.

Another aspect of the present method is that a low concentration of catalyst in a slurry can be accommodated. Wax in the slurry is removed from the system as solvent is added to replace the removed wax, whereby slurry levels are maintained.

Yet another aspect of the present invention is that the catalyst is not subjected to pumps or other mechanical devices which could cause attrition of the catalyst particles.

Yet another aspect of the present invention is that the process is operated separate from the FT reactor. Therefore, the extraction process can be operated under optimal pressures and temperatures, e.g., at or near supercritical conditions of the solvent. For example, the critical temperature and pressure for normal hexane are 507.9 K and 3034 KPa respectively.

It is an aspect of the present invention that the rate of removal of clarified solvent and wax from the dynamic settler can be adjusted from a low rate initially when primarily high-viscosity wax is being removed, to a high rate when primarily low-viscosity solvent is being removed.

Another aspect of the present invention is that the same apparatus can be used to carry out all of the steps from wax extraction to catalyst activation.

Other aspects of this invention will be apparent upon reading the following description and appended claims, reference being made to the accompanying drawings which form a part of this specification. In the drawings, like reference characters designate corresponding parts in the several views.

Figure 1:
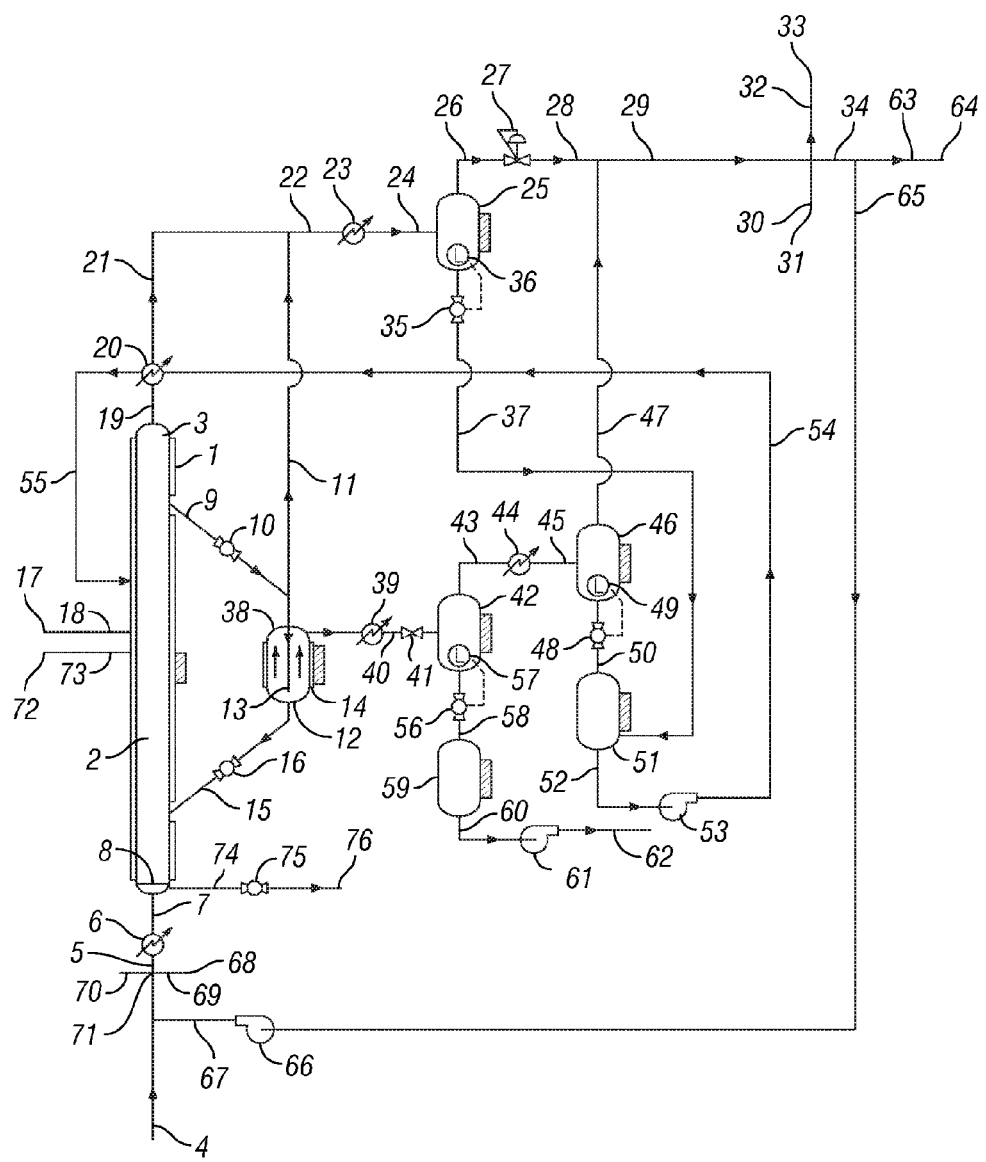
FIG. 1 is a schematic diagram of a solvent extraction apparatus comprising a slurry bubble column for intimately mixing a solvent and a slurry, a dynamic settler device for separating catalyst-free solvent and wax (described in U.S. Pat. No. 6,068,760 and incorporated herein by reference), a flash distillation vessel for separating solvent from wax, and other equipment useful for condensing and recovering solvent. After wax has been extracted from the catalyst, the catalyst can be oxidized and re-activated using the same apparatus.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION OF THE DISCLOSED EMBODIMENTS

The slurry removed from the FT reactor, and subjected to the extraction process described herein below, is a mixture of catalyst particles comprised of iron carbides, mainly $Fe_5C_2$ and $Fe_{2.2}C$, iron oxide in the form of magnetite, $Fe_3O_4$, and hydrocarbon molecules, primarily paraffins and olefins with carbon numbers ranging from about 15 to 100. A small amount of oxygenates may be present—mainly alcohols. The particle size of the catalyst particles may range from 1 to 100 µm.

The extraction of wax from the catalyst particles requires intimate mixing of the solvent with the slurry and catalyst particles. Efficient mixing can be effected by bubbling an inert gas up through the slurry in a bubble column reactor. A bubble column reactor useful for extraction in the instant case can be similar in design to the bubble column reactor used in a Fischer-Tropsch process described in U.S. Pat. No. 5,620,670 which is incorporated herein by reference. However, the operating parameters for extraction can be significantly different from the parameters used for a FT reaction. The pressure in the extractor can be selected to limit the amount of solvent leaving the extractor with the inert gas. The temperature of the extractor must be above the melting point of the wax, i.e., approximately 100° C. Superficial velocity, defined as the velocity that the inert gas would have in the extractor without slurry at the temperature and pressure of the extractor, is a key parameter. To achieve good mixing and prevent catalyst particle settling, the superficial velocity must be above about 2.5 cm/s.

The higher the extractor pressure, the larger the amount of inert gas flow required to achieve a desired superficial velocity. On the other hand, higher pressures reduce the amount of solvent in the overhead gases. In some instances it may be desirable to use desulfurized natural gas as the inert gas since this gas can be flared readily.

As the bulk wax is removed and replaced with solvent, it may be necessary to increase the pressure and/or temperature of the solvent to improve the effectiveness of removing wax from the pores of the catalyst particles and to reduce the amount of solvent carried overhead with the inert gas.

Removal of catalyst-free wax from the system is accomplished using a dynamic settler such as the one described in U.S. Pat. No. 6,068,760 which is incorporated herein by reference. The dynamic settler enables the removal of essentially catalyst-free wax from the system. The degree of liquid/catalyst separation is dependent upon the viscosity of the liquid and upon the upward velocity of the liquid in the settler. A sufficiently low upward velocity in the settler can result in a catalyst-free liquid removed from the settler. Unlike the situation wherein the settler must be designed to accommodate a fixed flowrate of wax from the settler when it is used as the primary wax/catalyst separation means on a FT reactor, the current application permits the flowrate to be varied according to the properties of the liquid being removed. For example, initially when the liquid being removed is primarily wax, the flowrate can be low to prevent entraining catalyst particles. As the extraction progresses, the flowrate can be increased since the liquid will contain primarily solvent possessing a low viscosity. To determine whether the catalyst has been fully dewaxed, a sample of solvent can be chilled to see whether wax crystals precipitate from the solvent.

The liquid mixture of wax and solvent from the settler is separated by flash evaporation, wherein the pressure of the liquid is reduced across a valve causing most of the solvent to vaporize and flow overhead from the flash vessel for condensing and recovery. The liquid wax is recovered from the bottom of the vessel. Since the temperature of the slurry in the extractor and in the settler may be too low for effective wax/solvent separation in the flash evaporator, it may be advantageous to increase the temperature of the wax/solvent mixture after the settler and before the flash evaporator. A higher temperature in the flash evaporator will lower the amount of solvent contained in the wax stream.

After wax has been removed from the catalyst, the liquid in the extractor will be wax-free solvent. This solvent must be removed from the extractor to leave a dry catalyst powder. Removal of the solvent from the extractor is accomplished by gradually lowering the extractor pressure, thereby causing the solvent to vaporize and leave in the overhead gases. The solvent is condensed and placed in a storage tank. By maintaining inert gas flow during the solvent vaporization step, the catalyst will not agglomerate.

The dry catalyst powder is ready for oxidation. The oxidation step burns off carbon deposits on the catalyst surface and produces carbon dioxide and possibly carbon monoxide. Oxidation can be carried out in the same vessel used for wax extraction. Air is added to the inert gas to produce a mixture containing about 2% by volume of oxygen. By preventing the catalyst bed temperature from exceeding about 220° C., sintering is avoided. Completion of oxidation can be determined by the lack of CO or $CO_2$ in the tail gases. The oxidation step can be carried out at a pressure slightly above atmospheric pressure. The flowrate of the oxidizing gas mixture should give a superficial velocity of about 2.5 cm/s.

It has been found that, in some cases, the alkali content of iron catalysts that have undergone the extraction and oxidation steps was significantly lower than that of fresh catalyst. Re-alkalization can be carried out in the same apparatus as was used for extraction and oxidation. Solvent containing the alkali promoter can be added to the vessel containing the oxidized catalyst. Inert gas bubbling through the slurry provides good mixing. The solvent can be evaporated from the reactor by raising the temperature until a dry catalyst powder is produced. Again, maintaining flow of inert gas during the drying step will prevent agglomeration of the catalyst particles.

The final step in catalyst regeneration is treating the catalyst with synthesis gas to form iron carbides. This activation step can be carried out in the same vessel in a fluidized bed mode or in a liquid slurry mode; however better temperature control can be achieved with a slurry. The slurry liquid medium is added to the catalyst powder, and inert gas is bubbled through the slurry at a superficial velocity greater than 2.5 cm/s. The pressure, temperature and syngas composition used in the activation step can be the same as those used during the initial activation of the fresh catalyst.

DETAILED DESCRIPTION OF THE DRAWINGS

As shown in FIG. 1, an apparatus according to an embodiment of the present disclosure comprises a slurry bubble column extractor 3, which serves to provide intimate mixing of the slurry 2 comprised of wax, catalyst, solvent and gas. Inert gas 4 is fed to gas preheater 6 through gas conduit 5 prior to being fed to the gas distributor 8 through preheated gas conduit 7. In the extraction step, gas 4 is the lift gas for circulating slurry 2 through to the dynamic settler 12 and it provides the energy for mixing slurry 2 in the bubble column extractor 3. The bubble column extractor 3 is equipped with heating/cooling apparatus 1 to maintain slurry 2 at the desired operating temperature. This device is offered by way of example and not limitation. Heating/cooling apparatus 1 can be a steam jacket, electrical heating elements, an internal tube bundle or other suitable means. Bubble column extractor 3 is equipped with a downward sloping slurry overflow conduit 9 which is connected to gas disengaging conduit 11, through valve 10. Gas disengaging conduit 11 unites with degassed slurry conduit 13 which is situated vertically along the centerline of dynamic settler 12.

Degassed slurry conduit 13 extends approximately 80% of the length of settler 12 and delivers degassed catalyst-bearing slurry near a bottom outlet of settler 12. The degassed slurry which exits conduit 13 flows as a free jet into the slurry which surrounds conduit 13. Gas bubbles leaving the slurry flowing in conduit 9 are directed through gas disengaging conduit 11 along with overhead gases from bubble column extractor 3 via gas outlet conduit 21 to a cooling heat exchanger 23 via mixture conduit 22. Conduit 24 carries the cooled gas mixture to a first separator vessel 25. Degassed slurry flows from settler 12 back to vessel 3 via valve 16 and return conduit 15. Due to the difference in densities of the degassed slurry and the bubbly slurry in vessel 3, the slurry and bubbles in conduit 9 and the degassed slurry in conduits 13 and 15 flow by natural circulation. Dynamic settler 12 is equipped with heating apparatus 14 to maintain the settler contents at a desired temperature. Initially, the clarified liquid removed from settler 12 will be primarily wax, whereas at the end of extraction, the clarified liquid will be only solvent.

Catalyst-free liquid, or the wax/solvent mixture, is removed from settler 12 via clarified liquid conduit 38 located near the top of settler 12. Note that the clarified liquid flows upward in an annular region surrounding degassed slurry conduit 13 opposite in direction to the slurry flow issuing from conduit 13 and requires catalyst particles to reverse directions. The wax/solvent mixture in clarified liquid conduit 38 contains dissolved gases and volatile solvent, which are separated from the liquid wax in flash vessel 42 by dropping the pressure across valve 41. It is advantageous to heat the wax/solvent mixture in heat exchanger 39 upstream of flash valve 41 to provide good separation of solvent in the vapor phase from wax in the liquid phase. Wax which collects at the bottom of flash vessel 42 is fed to collection tank 59 through evaporator wax conduit 58 and valve 56 which is actuated by liquid level controller 57 located at the bottom of flash vessel 42. Wax is pumped from collection tank 59 via tank wax conduit 60 by pump 61 and sent to wax storage or processing via wax storage conduit 62. The gaseous compounds in flash vessel 42 leave the top of vessel 42 via evaporator gas conduit 43 and are cooled in heat exchanger 44. The two-phase mixture leaving heat exchanger 44 flows through two-phase mixture conduit 45 into a second separator vessel 46. Liquids, primarily solvent, collecting in the bottom of second separator 46 are fed to storage tank 51 through separator vessel conduit 50 and valve 48 actuated by level controller 49 located in at the bottom of second separator vessel 46. The overhead gases from bubble column extractor 3 and gases in gas disengaging conduit 11 flow into gas outlet conduit 21. Mixture conduit 22 carries the gas mixture to cooling heat exchanger 23, whereby conduit 24 carries the cooled gas mixture to first separator vessel 25. The overhead gases from first separator 25 are fed to back-pressure regulator 27 via separator overhead gas conduit 26. The gases flowing through back-pressure regulator 27 in regulated gas conduit 28 are combined with gases flowing in separator overhead gas conduit 47 from second separator 46 and are sent to a flare 64 or other disposal means via disposal conduits 29, 34 and 63. A gas sample may be removed from disposal conduit 29 via sample line 32 to determine whether oxidation or catalyst activation, as discussed below, is complete.

In the case where the gases flowing in disposal conduit 29 are inert, combustible gas 30 can be added to inert gases present in gas conduit 31 to produce a suitable gas for flaring 64. Alternatively, inert gas carried in disposal conduits 29 and 34 may be routed via return gas conduit 65 to pump 66 for reintroduction into bubble column vessel 3 by means of conduits 67, 5, and 7.

During catalyst activation, inert gas 4, a purge gas, is fed to vessel 3 via conduit 5 to purge all oxygen from the system. Liquids, primarily solvent, in the bottom of first separator vessel 25 are released from separator vessel 25 through valve 35, which is controlled by liquid level controller 36, into storage tank 51 via separator vessel conduit 37. Liquids, primarily solvent, in the bottom of second vessel 46 are released from separator vessel 46 through valve 48, which is controlled by liquid level controller 49, into storage tank 51 via separator vessel conduit 48. Pump 53 pumps the primarily solvent liquids from storage vessel 51 into storage tank solvent return conduit 54 via solvent conduit 52. Pump 53 increases the pressure to a level greater than the pressure in bubble column extractor 3. The liquid in storage tank solvent return conduit 54 is fed to heat exchanger 20 whereby liquids (solvent) in storage tank solvent return conduit 54 are heated and bubble column extractor gases flowing in overhead gas conduit 19 are cooled. The heated liquids are fed to bubble column extractor 3 via heated solvent return conduit 55. Since some solvent will be lost to the overhead gases via disposal conduit 34 and to the wax stream via wax storage conduit 62, makeup solvent 17 is added to extractor 3 through makeup solvent conduit 18 in order to maintain a constant slurry height in extractor 3.

After completion of extraction, the temperature of the solvent in extractor 3 is lowered to about 90° C. by reducing the energy output of heater 1. This lower temperature is desirable to prevent violent flashing of the solvent when the pressure is lowered. After the extractor temperature has reached the desired level, settler 12 is isolated from extractor 3 by closing valves 10 and 16. Back-pressure regulator 27 is used to reduce the pressure of extractor 3 to about 50 psia. Under these conditions, the solvent evaporates, is condensed in cooling heat exchanger 23, and is separated from fluidizing gases in first separator vessel 25. Pump 53 is shut off and solvent from first separator 25 collects in storage tank 51 until the next extraction cycle. Evaporation of the solvent is continued until all of the solvent has been removed from extractor 3. Air 70 is added to inert gas 4 via air conduit 71 to produce an oxidizing gas containing about 2% by volume oxygen. The oxidizing gas is fed through gas conduit 5, heated to about 220° C. in heat exchanger 6 and fed to extractor 3 via preheated gas conduit 7 through gas distributor 8. In embodiments, gas distributor 8 comprises a sintered metal plate. The sintered metal plate can have a mean pore diameter in the range of from about 0.2 μm and about 2 μm. The temperature of the fluidized catalyst bed in extractor vessel 3 is controlled to about 220° C. and maintained for sufficient time to return the iron in the catalyst to hematite, $Fe_2O_3$. Completion of oxidation is determined by absence of carbon dioxide and carbon monoxide in gas sample 33 removed from disposal conduit 29 via sample line 32. Determination of the presence of carbon dioxide and/or carbon monoxide in gas sample 33 can be made using a gas chromatograph, infrared detectors, or any other suitable means.

Prior to catalyst activation, inert gas 4, a purge gas, is fed to vessel 3 via conduit 5 to purge all oxygen from the system. Wax, diesel or other appropriate slurry medium 72 is fed to bubble column vessel 3 via slurry medium conduit 73 to form a three-phase slurry comprised of catalyst precursor, slurry medium and inert gas in bubble column vessel 3. Activating gas 68 comprised of CO alone or CO combined with inert gas and $H_2$ is fed to preheater 6 via activating gas conduit 69 and gas conduit 5 and thence to vessel 3 via preheated gas conduit 7. The temperature and pressure are adjusted appropriately to cause formation of iron carbides. Progress of activation can be determined by analyzing tail gases 33 via sample line 32.

After completion of activation, activating gas 68 is shut off and replaced by inert gas 4 to purge all combustible gases from the catalyst-bearing slurry and reactor vessel 3 as determined by composition of tail gas 33. After purging and cooling the slurry to about 150° C., the resultant slurry 76 can be removed safely from reactor vessel 3 via product conduit 74 and valve 75. At this point, slurry 76 containing regenerated catalyst is ready for return to a Fischer-Tropsch slurry reactor.

Example 1

Calculations were carried out using Rentech's in-house computer programs to determine the approximate performance of the extractor and flash evaporator. A single compound tritriacontane ($C_{33}H_{58}$) was used to represent wax, and hexane was used as the solvent in the calculations. The inert gas was assumed to be nitrogen. The extractor parameters are listed below:

| | |
|---|---|
| Diameter | 61 cm |
| Height | 400 cm |
| Quantity of Wax | 1.72 kg · mols |
| Superficial velocity of $N_2$ | 2.5 cm/s |
| $N_2$ flowrate | 13.7 kg · mols/h |
| Gas holdup | 0.15 |
| Pressure | 1.72 MPaa |
| Temperature | 125° C. |

For the settler, it was assumed that initially the upward velocity would be only 4 cm/h since the wax would hinder settling of the catalyst. As the composition changed in the settler to a higher percentage of hexane, the upward velocity was assumed to increase according to the formula V=4+36*f, where f is the fraction of hexane in the liquid.

The parameters for the settler are as follows:

| | |
|---|---|
| Diameter | 91.4 cm |
| Liquid upward velocity | 4 cm/h for wax only |

-continued

| | |
|---|---|
| Liquid upward velocity | 40 cm/h for hexane only |
| Pressure | 1.72 MPaa |
| Temperature | 125° C. |

The flash evaporator parameters are:

| | |
|---|---|
| Pressure | 0.14 MPaa |
| Temperature | 204° C. |

Figure 2:
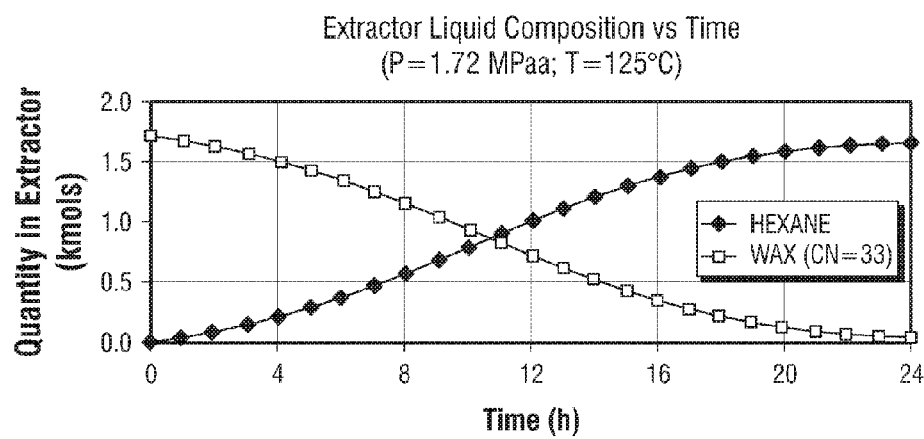
FIG. 2 is a graphical depiction of extractor liquid composition plotted against time using the parameters established in Example 1.
Figure 3:
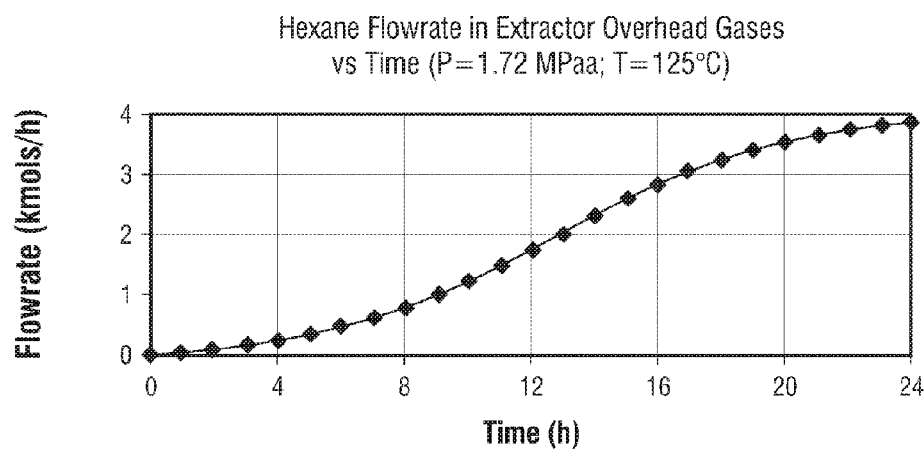
FIG. 3 is a graphical depiction of hexane flowrate in extractor overhead gases plotted against time using the parameters established in Example 1.
Figure 4:
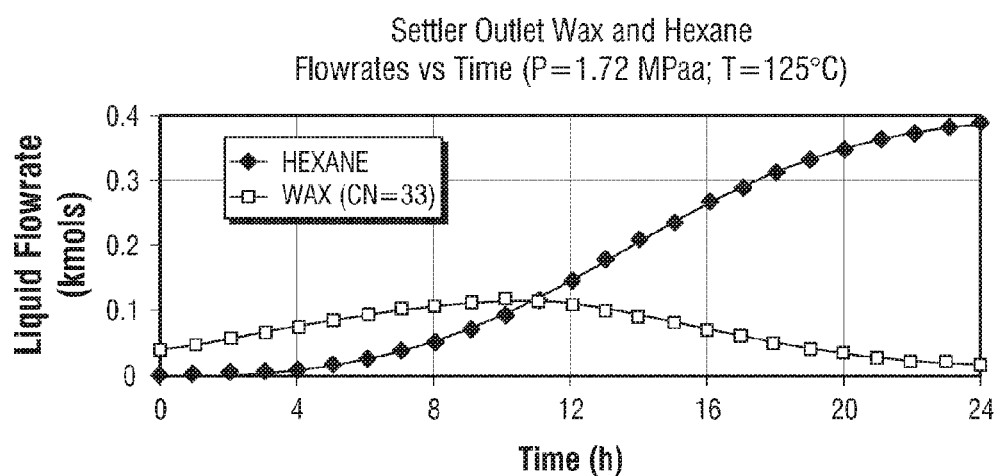
FIG. 4 is a graphical depiction of catalyst settling vessel outlet wax and hexane flowrates plotted against time using the parameters established in Example 1.
Figure 5:
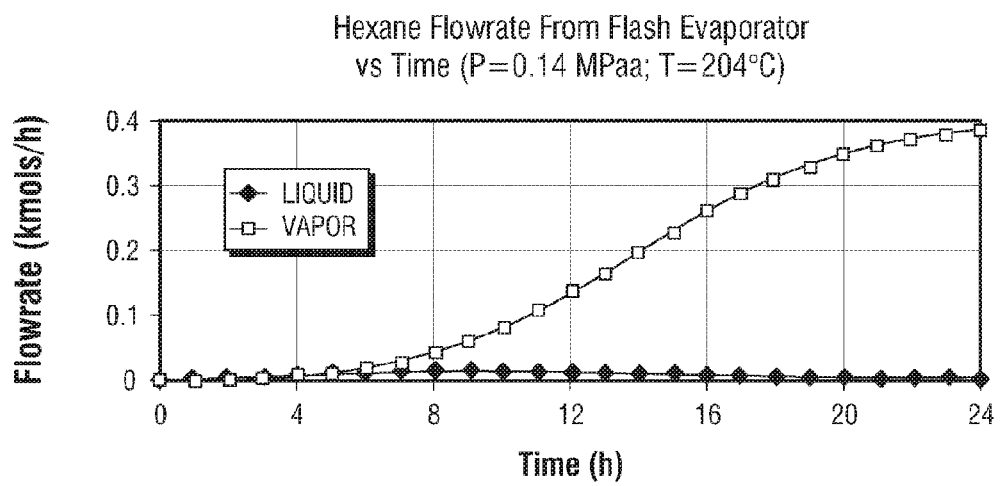
FIG. 5 is a graphical depiction of hexane flowrates from a flash evaporator plotted against time using the parameters established in Example 1.

In the example, hexane is recovered from the overhead condenser and from the flash evaporator reheated and recycled to the extractor to maintain liquid inventory in the extractor. There is a gradual replacement of wax by hexane initially and a more rapid replacement as the hexane fraction increases. This change in composition is shown in FIG. 2. According to this example, the extraction of wax from the slurry using hexane requires about 24 hours. Due to the stripping action of the nitrogen, hexane is carried overhead and recovered after condensing. The rate of hexane removed in the overhead gases as a function of time is shown in FIG. 3. FIG. 4 is a plot of flowrates of hexane and wax removed from the settler as a function of time. FIG. 5 is a plot of flowrates of liquid and vapor hexane from the flash evaporator according to the calculations for Example 1.

Example 1 is presented herein to show one embodiment of the invention and should not be construed as a limitation of the invention. Different gases, solvents, pressures and temperatures can be chosen by one skilled in the art to optimize the different steps of the invention. Solvents other than hexane such as hexene, heptane, heptene, tetrahydrofuran and Fischer-Tropsch naphtha can be used. Also, the novel method of wax extraction described herein can be applied to any wax-laden Fischer-Tropsch catalyst, including cobalt and ruthenium.

Although the present invention has been described with reference to the disclosed embodiments, numerous modifications and variations can be made and still the result will come within the scope of the invention. No limitation with respect to the specific embodiments disclosed herein is intended or should be inferred.

What is claimed is:

1. An apparatus comprising:
   a slurry bubble column extractor comprising an extraction solvent inlet configured for introduction of an extraction solvent into the slurry bubble column extractor, a gas inlet configured for introduction of gas into the slurry bubble column extractor, an overhead gas outlet configured for removal of overhead gas from the slurry bubble column extractor, a slurry inlet configured for recycle of catalyst to the slurry bubble column extractor, and a slurry outlet configured for removal of slurry from the slurry bubble column extractor;
   a dynamic settler comprising an inlet fluidly connected with said slurry outlet of said slurry bubble column extractor via a first conduit, and an outlet fluidly connected with said slurry inlet of said slurry bubble column extractor via a second conduit, wherein said dynamic settler is operable to separate a substantially catalyst-free liquid stream from a catalyst stream;
   a flash vessel fluidly connected with said dynamic settler via a clarified liquid conduit configured for removal of said substantially catalyst-free liquid stream from said dynamic settler, wherein said flash vessel is configured for separation of a vapor comprising vaporized extraction solvent from a liquid comprising Fischer-Tropsch wax;
   a gas/liquid separator positioned downstream of said flash vessel and fluidly connected therewith such that at least a portion of the extraction solvent removed as vapor from the flash vessel can be introduced into the gas/liquid separator, wherein said gas/liquid separator is configured for separation of an uncondensed gas from condensed extraction solvent; and
   a recycle line configured such that at least a portion of said condensed extraction solvent can be introduced into said extraction solvent inlet of said slurry bubble column extractor.

2. The apparatus of claim 1 wherein said first conduit and said second conduit are downward sloping, such that said apparatus is configured for natural circulation of a catalyst slurry from said slurry bubble column extractor into said dynamic settler via said first downward sloping conduit and for return of said catalyst stream to said slurry bubble column extractor via said second downward sloping conduit.

3. The apparatus of claim 1 further comprising valves on said first and second conduits whereby said dynamic settler can be isolated from said slurry bubble column extractor.

4. The apparatus of claim 1 wherein said dynamic settler comprises a degassed slurry conduit extending approximately 80% of the height of said dynamic settler from the top thereof.

5. The apparatus of claim 1 wherein said clarified liquid conduit is configured for removal of said substantially catalyst-free liquid stream from a top portion of said dynamic settler.

6. The apparatus of claim 1 further comprising a pressure reduction valve upstream of said flash vessel and downstream of said dynamic settler, said pressure reduction valve configured to reduce the pressure of said substantially catalyst-free liquid stream to a pressure at which a majority of said solvent vaporizes.

7. The apparatus of claim 1 further comprising a solvent selected from the group consisting of hexane, hexene, heptane, heptene, tetrahydrofuran, Fischer-Tropsch naphtha, and combinations thereof.

8. The apparatus of claim 1 further comprising a wax collection tank downstream of and fluidly connected with said flash vessel and configured for storage of Fischer-Tropsch wax separated from said solvent during wax removal.

9. The apparatus of claim 1 further comprising:
   a cooler configured to cool overhead gases from said slurry bubble column extractor, thus condensing a first liquid product; and
   a first separator configured to separate uncondensed gas from said first liquid product.

10. The apparatus of claim 9 further comprising a flare configured for flaring a portion of said uncondensed gas separated from said first liquid product in said first separator, a portion of said gas separated from said condensed extraction solvent in said gas/liquid separator, or both.

11. The apparatus of claim 9 further comprising a recycle line fluidly connecting said first separator with said slurry bubble column extractor, whereby a portion of said uncondensed gas separated from said first liquid product in said first separator can be recycled to said slurry bubble column extractor.

12. The apparatus of claim 9 wherein said first separator is fluidly connected with said slurry bubble column extractor via a gas outlet conduit.

13. The apparatus of claim 12 wherein said dynamic settler further comprises a gas outlet fluidly connected with said gas outlet conduit upstream of said first separator.

14. The apparatus of claim 9 further comprising a liquid storage vessel positioned downstream of said gas/liquid separator, said first separator, or both, such that said condensed extraction solvent, said first liquid product, or both can be stored therein.

15. The apparatus of claim 14 further comprising a recycle line fluidly connecting said liquid storage vessel with said slurry bubble column extractor such that a portion of said first liquid product, a portion of said condensed extraction solvent, or a portion of both can be recycled to said slurry bubble column extractor.

16. The apparatus of claim 1 further comprising a gas distributor configured to distribute a gas uniformly across a cross section of said slurry bubble column extractor.

17. The apparatus of claim 16 wherein said gas distributor comprises a sintered metal plate.

\* \* \* \* \*